United States Patent
Kimoto et al.

(10) Patent No.: US 11,618,391 B2
(45) Date of Patent: Apr. 4, 2023

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yuichi Kimoto, Yokkaichi (JP); Koji Fukumoto, Yokkaichi (JP); Yasushi Itani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 208 days.

(21) Appl. No.: 17/259,724

(22) PCT Filed: Jul. 23, 2019

(86) PCT No.: PCT/JP2019/028779
§ 371 (c)(1),
(2) Date: Jan. 12, 2021

(87) PCT Pub. No.: WO2020/026884
PCT Pub. Date: Feb. 6, 2020

(65) Prior Publication Data
US 2021/0339690 A1    Nov. 4, 2021

(30) Foreign Application Priority Data
Jul. 30, 2018   (JP) .............................. JP2018-142517

(51) Int. Cl.
*B60R 16/02* (2006.01)
*H02G 3/04* (2006.01)

(52) U.S. Cl.
CPC ....... *B60R 16/0215* (2013.01); *H02G 3/0412* (2013.01); *H02G 3/0487* (2013.01)

(58) Field of Classification Search
CPC ............ B60R 16/0215; B60R 16/0207; H02G 3/0487; H02G 3/0412; H05K 9/00; H05K 9/0098
See application file for complete search history.

(56) References Cited

U.S. PATENT DOCUMENTS 6,789,311 B2 * 9/2004 Fidi ....................... H01F 41/077
29/605
9,522,640 B2   12/2016 Kanagawa
(Continued)

FOREIGN PATENT DOCUMENTS

JP    2005-044607 A    2/2005
JP    2012235666 A *   11/2012 ............... H02G 3/04
(Continued)

OTHER PUBLICATIONS

Aug. 20, 2019 International Search Report issued in International Patent Application No. PCT/JP2019/028779.

*Primary Examiner* — Paresh Paghadal
(74) *Attorney, Agent, or Firm* — Oliff PLC

(57) ABSTRACT

A wire harness including: a plurality of wires each including a core wire whose transverse cross-sectional shape is a flat shape, and an insulating sheath covering an outer circumference of the core wire; a plurality of outer covers into which the plurality of wires are inserted respectively, wherein the outer covers are independent of each other and each have a flat tubular shape; and a clamp that is attached
(Continued)

to an outer circumferential surface of the outer covers and that fix the outer covers to a vehicle body.

8 Claims, 8 Drawing Sheets

(56)  References Cited

U.S. PATENT DOCUMENTS

| | | | | |
|---|---|---|---|---|
| 2008/0296044 | A1* | 12/2008 | Chiang | H01B 7/38 |
| | | | | 174/117 FF |
| 2011/0127084 | A1* | 6/2011 | Ichikawa | H02G 3/0468 |
| | | | | 174/72 A |
| 2012/0261185 | A1* | 10/2012 | Murao | H01B 7/08 |
| | | | | 174/72 A |
| 2012/0305308 | A1* | 12/2012 | Toyama | H02G 3/0481 |
| | | | | 174/70 R |
| 2016/0229358 | A1 | 8/2016 | Nakai et al. | |
| 2017/0028945 | A1* | 2/2017 | Kimura | B60R 16/0215 |
| 2018/0056897 | A1 | 3/2018 | Shimizu et al. | |
| 2019/0123532 | A1* | 4/2019 | Ito | H02G 3/0406 |
| 2020/0258657 | A1* | 8/2020 | Nakai | H05K 9/00 |

FOREIGN PATENT DOCUMENTS

| | | |
|---|---|---|
| JP | 2015-162915 A | 9/2015 |
| JP | 2016-54030 A | 4/2016 |
| JP | 2018-041714 A | 3/2018 |
| WO | 2011/096426 A1 | 8/2011 |
| WO | 2015/049980 A1 | 4/2015 |

* cited by examiner

WIRE HARNESS

BACKGROUND

The present disclosure relates to a wire harness.

Conventionally, a wire harness used in a vehicle such as a hybrid vehicle or an electric vehicle is provided with wires for electrically connecting electrical devices such as a high-voltage battery and an inverter (e.g., see JP 2016-54030A). In this wire harness, a plurality of wires are collectively covered by an outer cover member such as a corrugated tube or a metal pipe in order to protect the wires.

SUMMARY

Incidentally, in recent years, the amount of currents flowing through wires inserted into the outer cover member has increased, and a large amount of heat is generated by the wires. Thus, there is demand for improvement of the heat dissipation of a wire harness provided with an outer cover member and wires.

An exemplary aspect of the disclosure provides a wire harness by which heat dissipation can be improved.

A wire harness according to an exemplary aspect includes: a plurality of wires each including a core wire whose transverse cross-sectional shape is a flat shape, and an insulating sheath covering an outer circumference of the core wire; a plurality of outer covers into which the plurality of wires are inserted respectively, wherein the outer covers are independent of each other and each have a flat tubular shape; and a clamp that is attached to an outer circumferential surface of the outer covers and that fix the outer covers to a vehicle body.

According to a wire harness of the present disclosure, it is possible to improve heat dissipation.

DETAILED DESCRIPTION OF EMBODIMENTS

Figure 1:
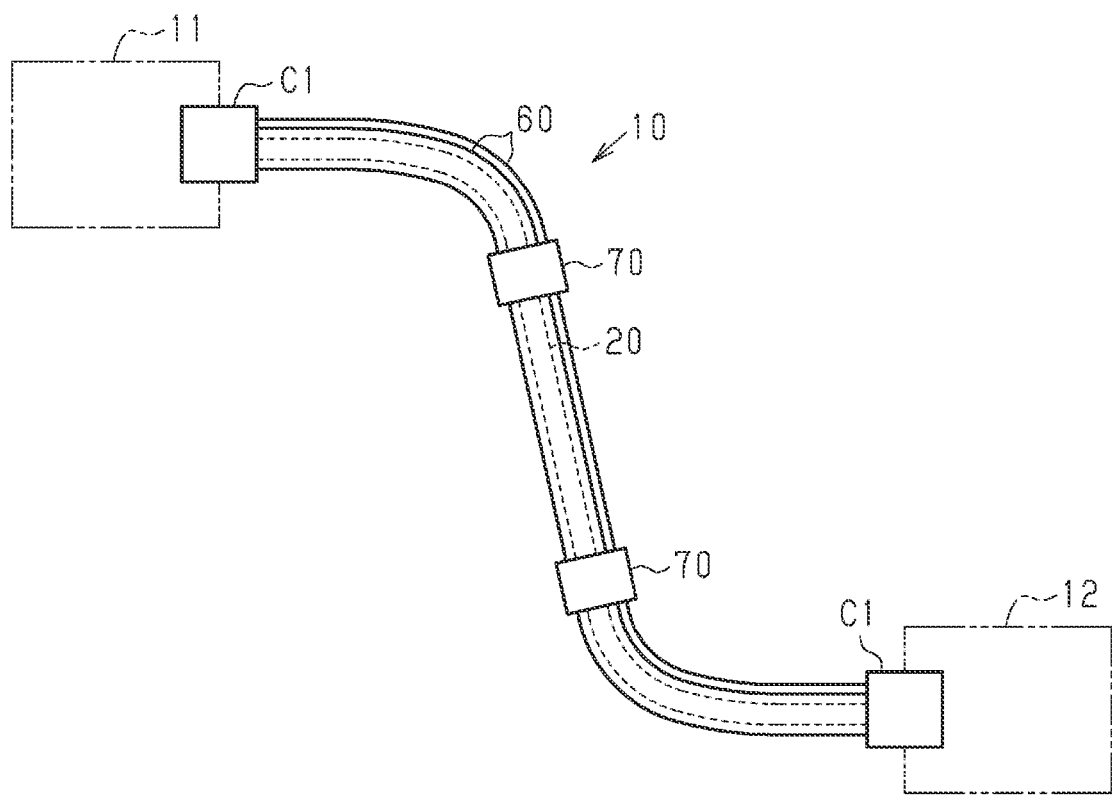
FIG. 1 is a schematic configuration diagram of a wire harness in a first embodiment.

The following describes embodiments with reference to the attached drawings. Note that, in the drawings, some of the components may be exaggerated or simplified for the sake of description. Also, the dimensional ratio of some parts may differ from their actual ratio.

First Embodiment

A wire harness 10 shown in FIG. 1 electrically connects two electric apparatuses (devices), or three or more electric apparatuses (devices). The wire harness 10 electrically connects an inverter 11 disposed in a front part of a vehicle, such as a hybrid vehicle or an electric vehicle, and a high-voltage battery 12 disposed in a part of the vehicle rearward of the inverter 11, for example. The wire harness 10 is routed under the floor of the vehicle, for example. The inverter 11 is connected to a wheel driving motor (not shown), which is a power source for driving the vehicle. The inverter 11 generates AC power from DC power that is supplied from the high-voltage battery 12, and supplies the AC power to the motor. The high-voltage battery 12 is a battery that can supply a voltage of several hundred volts, for example.

The wire harness 10 includes a plurality (two in this embodiment) of wires 20, a pair of connectors C1 attached to opposite ends of the wires 20, a plurality of outer cover members 60 (plurality of outer covers) into which the plurality of wires 20 are inserted respectively, and a plurality (two in FIG. 1) of clamps 70. The wires 20 are elongated and extend in the front-back direction of the vehicle, for example. The wires 20 are high-voltage wires that can handle high voltages and large currents, for example. One end of the wires 20 is connected to the inverter 11 via one of the connectors C1, and the other end of the wires 20 is connected to the high-voltage battery 12 via the other connector C1. The outer cover members 60 protect the wires 20 from flying objects and water droplets, for example. The plurality of outer cover members 60 are fixed to a vehicle body or the like by the clamps 70.

Figure 2:
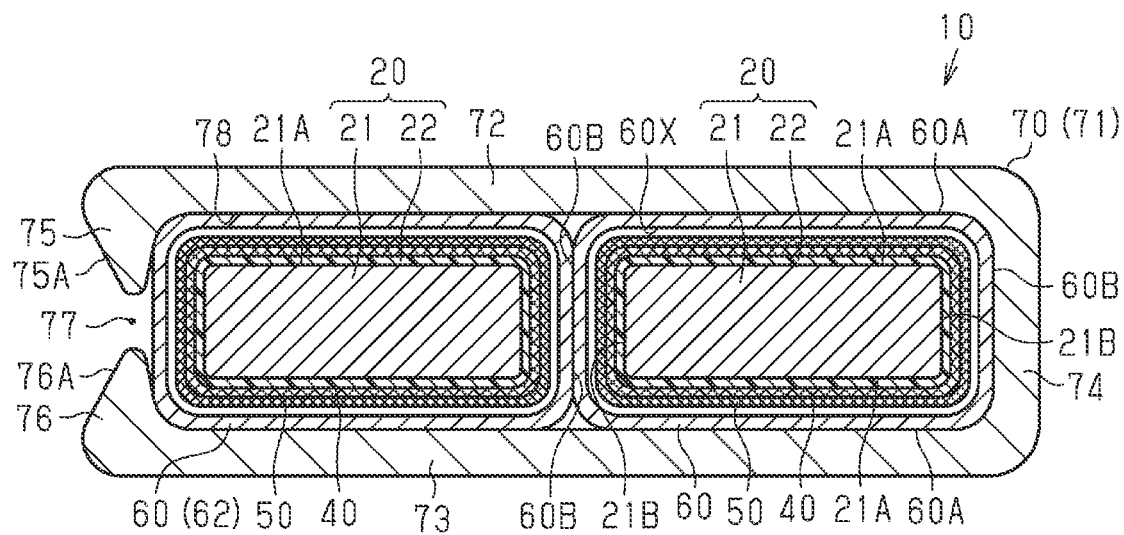
FIG. 2 is a schematic cross-sectional view of the wire harness in the first embodiment.

As shown in FIG. 2, the wires 20 each include a core wire 21 formed by a conductor and an insulating sheath 22 that covers an outer circumference of the core wire 21. The wires 20 are non-shielded wires that have no shielding structure, for example.

The core wires 21 have an elongated shape. The core wires 21 are flexible, and therefore are bendable into a shape extending along the route where the wire harness 10 is routed, for example. A transverse cross-sectional shape of each core wire 21 (that is, a cross-sectional shape obtained by cutting the core wire 21 along a plane that is orthogonal to the length direction of the core wire 21) is a flat shape, for example. In this specification, "flat shape" includes rectangular, oval, and elliptical shapes, for example. A "rectangular shape" in this specification has long sides and short sides, and does not include square shapes. Also, "rectangular shape" in this specification also includes shapes obtained by chamfering a ridge portion and shapes obtained by rounding a ridge portion.

The transverse cross-sectional shape of the core wire 21 in this embodiment is a rectangular shape. The core wires 21 each have the same rectangular transverse cross-sectional shape over the entire length of the core wire 21 in the length direction. The core wire 21 has a pair of long-side surfaces 21A that include the long sides of the above-described rectangle, and a pair of side surfaces 21B that include the short sides of the rectangle. The pair of long-side surfaces 21A and the pair of side surfaces 21B are flat surfaces.

Figure 3:
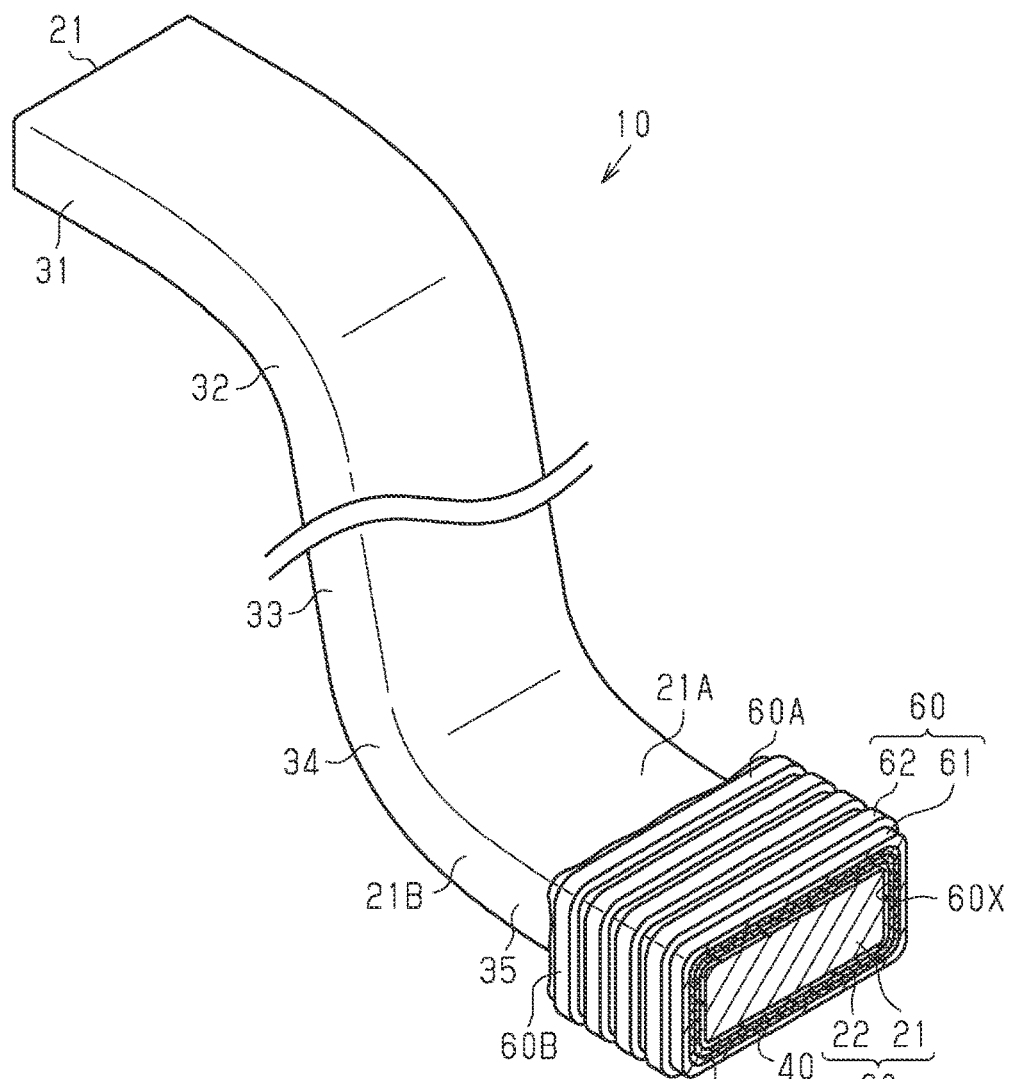
FIG. 3 is a schematic perspective view of the wire harness in the first embodiment.

As shown in FIG. 3, the core wires 21 are bendable two-dimensionally or three-dimensionally, for example. The core wires 21 are bent in a predetermined shape according to the route where the wire harness 10 is routed, for example. The core wires 21 in this embodiment each include a straight portion 31 extending along the front-back direction of a vehicle, a bending portion 32 provided at an end portion of the straight portion 31, an extension portion 33 extending from the bending portion 32 toward a lower side of the vehicle, a bending portion 34 provided at an end portion of the extension portion 33, and a straight portion 35 extending from the bending portion 34 along the front-back direction of the vehicle. The core wires 21 in this embodiment are bent and extend in two directions of the front-back direction of the vehicle and the vertical direction of the vehicle.

The bending portions 32 and 34 are formed by bending the long-side surfaces 21A of the core wire 21 in a thin direction (a short-side direction). The bending portions 32 and 34 are bent at substantially the same curvature over the entire length of the long-side surfaces 21A in the thick direction (a long-side direction). In other words, the bending portions 32 and 34 in this embodiment are not portions formed by twisting the long-side surfaces 21A. However, the bending portions 32 and 34 may also be formed by twisting the long-side surfaces 21A.

A twisted wire obtained by twisting a plurality of bare metal wires together, a columnar conductor (a single core wire, a bus bar, or the like) constituted by one columnar metal rod whose inside is solid, or a tubular conductor (a pipe conductor) whose inside is hollow can be used for the core wire 21, for example. The core wires 21 in this embodiment are constituted by twisted wires. A metallic material such as a copper-based material or an aluminum-based material can be used as the material of the core wire 21, for example. The core wires 21 are formed through extrusion molding, for example. The core wires 21 are molded by compressing, using a mold or the like, a twisted wire whose transverse cross-sectional shape is molded into a circular shape through extrusion molding, such that they have the desired transverse cross-sectional shape (a rectangular shape in this embodiment).

As shown in FIG. 2, the insulating sheaths 22 respectively cover the entire outer circumferential surfaces of the core wires 21 in intimate contact (by areal contact), for example. The outer circumferential surfaces of the insulating sheaths 22 have a shape extending along the outer circumferential surfaces of the respective core wires 21, for example. Each insulating sheath 22 in this embodiment has a rectangular tubular shape whose inner and outer circumferential cross-sectional shapes are rectangular. The insulating sheath 22 is made of an insulating material such as synthetic resin, for example. The insulating sheath 22 can be formed through, for example, extrusion molding (extrusion coating) on the core wire 21.

A protective member 40 (protective tube) is formed on the outer circumference of each wire 20 to cover the outer circumference of the wire 20. The protective member 40 is formed by weaving highly insulating reinforced fibers with high shear resistance. The protective member 40 is more flexible than the core wire 21, for example.

Examples of the reinforced fibers constituting the protective member 40 include para-aramid fibers, polyarylate fibers, PBO (poly(p-phenylene benzobisoxazole)) fibers, PET (polyethylene terephthalate) fibers, ultra high molecular weight polyethylene fibers, PEI (polyether imide) fibers, glass fibers, and ceramic fibers, and it is preferable to use one or more thereof according to the properties required for the protective members 40. The protective members 40 in this embodiment are each constituted by one type of para-aramid fibers.

The protective members 40 have a tubular shape, and respectively cover the entire outer circumferences of the wires 20. Each protective member 40 covers the outer circumferential surface of the insulating sheath 22 and is in contact with the outer circumferential surface of the insulating sheath 22, for example. The outer circumferential surface of the protective member 40 has a shape extending along the outer circumferential surfaces of the insulating sheath 22 (the core wire 21), for example. Each protective member 40 in this embodiment has a rectangular tubular shape whose inner and outer circumferential cross-sectional shapes are rectangular. The protective members 40 are provided over substantially the entire length of the wires 20 in their length direction, for example.

An electromagnetic shielding member 50 (electromagnetic shield) is formed on the outer circumference of each protective member 40 to cover the outer circumference of the protective member 40. It is possible to use a braided member in which a plurality of bare metal wires are brained into a tubular shape, or a metal film for the electromagnetic shielding member 50, for example. The electromagnetic shielding members 50 are more flexible than the core wires 21, for example.

The electromagnetic shielding members 50 have a tubular shape, and respectively enclose the entire outer circumferences of the wires 20 and the entire outer circumferences of the protective members 40 that enclose the wires 20. Each electromagnetic shielding member 50 covers the outer circumferential surface of the protective member 40 and is in contact with the outer circumferential surface of the protective member 40, for example. The outer circumferential surface of the electromagnetic shielding member 50 has a shape extending along the outer circumferential surface of the protective member 40 (the core wire 21), for example. The electromagnetic shielding member 50 in this embodiment has a rectangular tubular shape whose inner and outer circumferential cross-sectional shapes are rectangular. The protective members 50 are provided over substantially the entire length of the wires 20 in their length direction, for example.

Each outer cover member 60 has an overall elongated tubular shape. The wires 20 are arranged respectively in internal spaces 60X of the outer cover members 60. The protective member 40 and the electromagnetic shielding member 50 enclosing the wire 20 are housed in the internal space 60X of the outer cover member 60.

Metal pipes or resin pipes, corrugated tubes, waterproof rubber covers, or a combination thereof may be used for the outer cover members 60, for example. A metallic material such as an aluminum-based material or a copper-based material can be used as the material of a metal pipe or a corrugated tube, for example. A conductive resin material or a resin material that has no conductivity can be used as the material of a resin pipe or a corrugated tube, for example.

As shown in FIG. 3, the outer cover member 60 in this example is a corrugated tube that has an accordion structure in which annular recesses 61 and annular protrusions 62 are arranged alternately in the length direction. A resin material that has no conductivity is used as the material of the outer cover members 60 in this embodiment. It is possible to use synthetic resin such as polyolefin, polyamide, polyester, or an ABS resin, for this resin material, for example. The outer cover members 60 are more flexible than the core wires 21.

The outer cover members 60 in this embodiment are flat tubular corrugated tubes. That is, the outer cover members 60 have a flat inner circumferential cross-sectional shape and a flat outer circumferential cross-sectional shape, for example. The inner circumferential surfaces of the outer cover members 60 have a shape extending along the outer circumferential surfaces of the respective wires 20 that are inserted therein, for example. The annular recesses 61 and the annular protrusions 62 in this embodiment each have a rectangular tubular shape whose inner and outer circumferential cross-sectional shapes are rectangular. The outer circumferential surface of the outer cover member 60 (the annular recess 61 and the annular protrusion 62) have a pair of long-side surfaces 60A that include long sides of the above-described rectangle, and a pair of side surfaces 60B that include short sides of the rectangle. The long-side surfaces 60A face the respective long-side surfaces 21A of the core wire 21, and the side surfaces 60B face the respective side surfaces 21B of the core wire 21. Here, the internal spaces 60X of the annular protrusions 62 are wider than the internal spaces 60X of the annular recesses 61.

The internal space 60X of the outer cover member 60 (specifically, the internal space 60X of the annular recess 61) is set to a size that is slightly larger than that of an outer shape of the electromagnetic shielding member 50 that encloses the wire 20 and the protective member 40, for example. The size difference between the internal space 60X of the annular recess 61 and the outer shape of the electromagnetic shielding member 50 is set in consideration of a clearance, a dimensional tolerance, and the like that are required to insert the wire 20, the protective member 40, and the electromagnetic shielding member 50 into the outer cover member 60. At least a portion of the outer circumferential surface of the electromagnetic shielding member 50 and a portion of the inner circumferential surface of the annular recesses 61 that face each other are in contact with each other, for example. The contact between the outer circumferential surface of the electromagnetic shielding member 50 and the inner circumferential surface of the annular recesses 61 may be any of a surface contact, a line contact, and a point contact.

As shown in FIG. 2, a plurality (two in this embodiment) of outer cover members 60 are separately and independently formed. The two outer cover members 60 are formed to have the same shape and the same size, for example. The two outer cover members 60 are arranged side-by-side in the long-side direction (the thick direction) of the core wires 21 and the outer cover members 60, for example. That is, the two outer cover members 60 are arranged side-by-side in a state in which their side surfaces 60B face each other. The two outer cover members 60 are arranged side-by-side in a state in which the side surfaces 60B are in contact with each other, for example. Accordingly, the two wires 20 that are respectively inserted into the two outer cover members 60 are arranged such that the side surfaces 21B of the core wires 21 face each other. In the wire harness 10 of this embodiment, a cross-section obtained by collecting (bundling) a plurality of outer cover members 60 together has a rectangular shape overall.

The two outer cover members 60 are arranged side-by-side in the width direction of the vehicle (a direction orthogonal to a paper plane in FIG. 1), for example. That is, the two outer cover members 60 are arranged such that the long-side direction (the thick direction) of the outer cover members 60 extends in the width direction of the vehicle. In other words, the two outer cover members 60 are arranged such that the short-side direction (the thin direction) of the outer cover members 60 extends in the vertical direction of the vehicle (a direction perpendicular to the paper plane in FIGS. 1 and 2).

The clamps 70 are provided to collectively fix the plurality of outer cover members 60, for example. The clamps 70 are attached to an outer circumferential surface of the plurality of outer cover members 60 to maintain a state in which the plurality of outer cover members 60 are bundled together (a joined state).

The clamps 70 each have a fitting portion 71 that is fitted to the outside of the plurality of outer cover members 60, and a fixing portion (not shown) to be fixed to a vehicle. A resin material or a metallic material can be used as the material of the clamps 70, for example. It is possible to use a conductive resin material or a resin material that has no conductivity as the resin material, for example. It is possible to use a metallic material such as an iron-based material or an aluminum-based material as the metallic material, for example.

The fitting portions 71 in this embodiment are substantially C-shaped. That is, the fitting portions 71 have a discontinuous annular structure. The fitting portion 71 includes a pair of plate portions 72 and 73 that face each other, a connection portion 74 connecting one end portion of the plate portion 72 and one end portion of the plate portion 73, and locking portions 75 and 76 provided at the other end portions of the plate portions 72 and 73. The fitting portion 71 is a single component in which the plate portions 72 and 73, the connection portion 74, and the locking portions 75 and 76 are formed as a single body, for example.

The plate portions 72 and 73 each have an inner surface extending along the long-side surfaces 60A of the two outer cover members 60. Specifically, the plate portions 72 and 73 each have an inner surface extending along the long-side surfaces 60A of the two outer cover members 60 that are arranged side-by-side in the long-side direction.

The connection portion 74 connects an end portion of the plate portion 72 and an end portion of the plate portion 73. The connection portion 74 has an inner surface extending along the side surface 60B of the outer cover member 60, for example.

The locking portions 75 and 76 are respectively provided at end portions of the plate portions 72 and 73 that are located opposite to the connection portion 74. That is, the locking portions 75 and 76 are provided at positions that are located opposite to the connection portion 74 in the long-side direction. The locking portion 75 extends from an end portion of the plate portion 72 toward the plate portion 73. The locking portion 76 extends from an end portion of the plate portion 73 toward the plate portion 72. A leading end portion of the locking portion 75 is provided at a position spaced apart from a leading end portion of the locking portion 76, facing the leading end portion of the locking portion 76. The fitting portion 71 is provided with an insertion portion 77 into which the plurality of outer cover members 60 are insertable, due to the space located between the locking portions 75 and 76. An opening width of the insertion portion 77 is set shorter than the length of the side surface 60B of the outer cover member 60 in the short-side direction. Also, the fitting portion 71 is provided with a housing portion 78 in which the plurality of outer cover members 60 are housed in the space bounded by the inner surfaces of the plate portions 72 and 73, the inner surface of the connection portion 74, and the inner surfaces of the locking portions 75 and 76.

An outer surface of the locking portion 75 is an inclined surface 75A that is inclined toward the connection portion 74 when following the inclined surface 75A from a base end portion of the locking portion 75 (the end portion connected to the plate portion 72) toward its leading end portion (the end portion located opposite to the base end portion). An outer surface of the locking portion 76 is an inclined surface 76A that is inclined toward the connection portion 74 when following the inclined surface 76A from a base end portion of the locking portion 76 (the end portion connected to the plate portion 73) toward its leading end portion (the end portion located opposite to the base end portion). That is, the inclined surfaces 75A and 76A are inclined such that the opening width of the insertion portion 77 increases as the distance from the housing portion 78 increases.

The fitting portion 71 is configured to be deformable between a first orientation in which the plurality of outer cover members 60 are insertable from the insertion portion 77 into the housing portion 78 and a second orientation in which the plurality of outer cover members 60 inserted from the insertion portion 77 can be supported in the housing portion 78. That is, the fitting portion 71 is elastically deformable such that the gap between the locking portion 75 and the locking portion 76 (that is, the opening width of the insertion portion 77) increases. When the outer cover member 60 into which the wire 20 and the like are inserted is inserted into the insertion portion 77, for example, the fitting portion 71 elastically deforms such that the gap between the leading end portion of the locking portion 75 and the leading end portion of the locking portion 76 temporarily increases. Also, when the outer cover member 60 passes through the insertion portion 77 and is fitted into the housing portion 78, the fitting portion 71 elastically returns such that the annular structure of the fitting portion 71 returns to the original shape, that is, the fitting portion 71 elastically returns such that the gap between the leading end portion of the locking portion 75 and the leading end portion of the locking portion 76 decreases. That is, the fitting portion 71 and the two outer cover members 60 in this embodiment form a snap-fit structure, using elastic deformation to prevent the outer cover members 60 from coming off. Note that at least a portion of the inner surface of the fitting portion 71 is in contact with the outer circumferential surface of the outer cover member 60 in a state in which the plurality of outer cover members 60 are housed in the housing portion 78.

The clamps 70 are fixed to a vehicle body by fixing portions (not shown). The plurality of outer cover members 60 are fixed to the vehicle body by the clamps 70.

Figure 4:
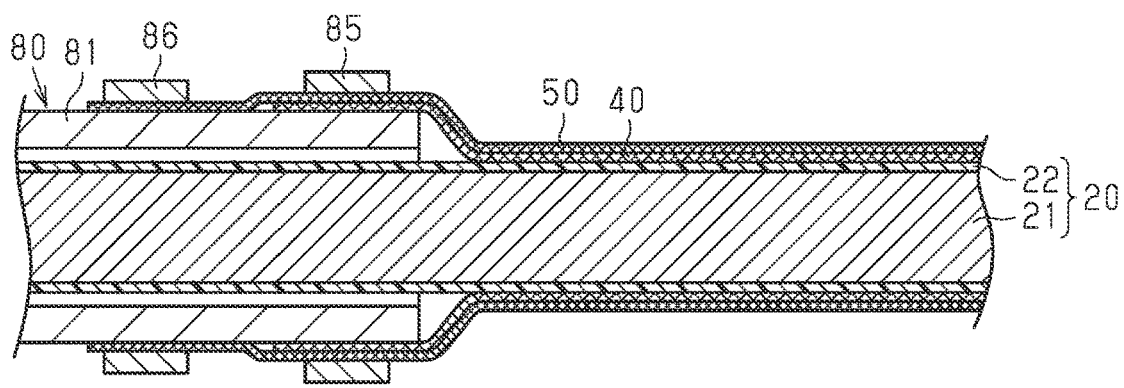
FIG. 4 is a schematic cross-sectional view of the wire harness in the first embodiment.

Next, the structure of end portions of the protective member 40 and the electromagnetic shielding member 50 will be described below with reference to FIG. 4. Here, the structure of end portions of the protective member 40 and the electromagnetic shielding member 50 at the inverter 11 will be described. Note that the outer cover members 60 are not shown in FIG. 4.

An end portion of the wires 20 is inserted into a shield shell 80 of the connector C1 (see FIG. 1) connected to the inverter 11. The shield shell 80 has conductive tubular members 81 (conductive tube) into which the wires 20 are inserted respectively, for example. The tubular members 81 (the shield shell 80) are made of metal. It is possible to use a metallic material such as an iron-based material or an aluminum-based material as the material of the tubular members 81, for example. The tubular member 81 may also be subjected to surface treatment such as tin plating or aluminum plating, in accordance with the types of constituent metals and usage environments.

Each tubular member 81 has a rectangular tubular shape whose inner and outer circumferential cross-sectional shapes are rectangular, for example. Out of the wires 20, the protective members 40, and the electromagnetic shielding members 50, only the wires 20 are inserted into the inner portions of the tubular member 81. The end portions of the protective member 40 and the electromagnetic shielding member 50 are fixed to the outer circumferential surface of the tubular member 81. The end portion of the protective member 40 is fitted to the outside of the tubular member 81, enclosing the entire circumference of the tubular member 81, for example. The end portion of the electromagnetic shielding member 50 is fitted to the outside of the protective member 40 that is fitted to the outside of the tubular member 81, enclosing the entire circumference of the protective member 40, for example. The entire length of the electromagnetic shielding member 50 is longer than that of the protective member 40, and the electromagnetic shielding member 50 extends further toward the inverter 11 than the protective member 40 does. A portion of the electromagnetic shielding member 50 that extends further toward the inverter 11 than the protective member 40 does covers an end surface of the protective member 40, and is fitted to the outside of the tubular member 81 in direct contact with the outer circumferential surface of the tubular member 81.

The end portion of the protective member 40 is connected to the outer circumferential surface of the tubular member 81 by a crimping ring 85 provided on the outer circumferential side of the electromagnetic shielding member 50 in a state in which the end portion is held between the tubular member 81 and the electromagnetic shielding member 50. The crimping ring 85 is fitted to the outside of the tubular member 81 in a state in which the end portions of the electromagnetic shielding member 50 and the protective member 40 are held between the outer circumferential surface of the tubular member 81 and the crimping ring 85. Also, when the crimping ring 85 is crimped, the end portions of the electromagnetic shielding member 50 and the protective member 40 are tightly fixed to the outer circumferential surface of the tubular member 81.

The end portion of the electromagnetic shielding member 50 is connected to the outer circumferential surface of the tubular member 81 by a crimping ring 86 provided on the outer circumferential side of the electromagnetic shielding member 50 in a state in which the end portion of the electromagnetic shielding member 50 covers an end surface of the end portion of the protective member 40 and is in direct contact with the outer circumferential surface of the tubular member 81. The crimping ring 86 is fitted to the outside of the tubular member 81 in a state in which it holds only the end portion of the electromagnetic shielding member 50 (that is, not the protective member 40) between the outer circumferential surface of the tubular member 81 and the crimping ring 86. Also, when the crimping ring 86 is crimped, the end portion of the electromagnetic shielding member 50 is tightly fixed to the outer circumferential surface of the tubular member 81 in a state in which the end portion of the electromagnetic shielding member 50 is in direct contact with the outer circumferential surface of the tubular member 81. This ensures a stable electrical connection between the electromagnetic shielding member 50 and the tubular member 81 (the shield shell 80).

Although the structure of end portions of the protective member 40 and the electromagnetic shielding member 50 at the inverter 11 has been described above, the same structure is provided to their end portions at the high-voltage battery 12.

Next, effects of this embodiment will be described below.

(1-1) The plurality of outer cover members 60 are independently formed, and the wires 20 are inserted respectively into the outer cover members 60. Accordingly, the gap (air layer) between the wire 20 and the outer cover member 60 can be made smaller, compared to a case where a plurality of wires 20 are collectively enclosed by one outer cover member. It is possible to reduce an air layer, that is, a heat insulating layer between the outer circumferential surface of the wire 20 and the inner circumferential surface of the outer cover member 60, and thus, to reduce thermal resistance between the outer circumferential surface of the wire 20 and the inner circumferential surface of the outer cover member 60. This inhibits heat generated by the wire 20 from being trapped in the outer cover member 60, and allows heat generated by the wire 20 to be efficiently released from the outer circumferential surface of the outer cover member 60 to the atmosphere. This makes it possible to efficiently release heat generated by the wire 20 and to improve the heat dissipation of the wire harness 10. As a result, it is possible to keep the temperature of the wire 20 from increasing.

(1-2) Furthermore, it is possible to reduce the length of the outer cover member 60 in the thick direction to be smaller than or equal to half of the length of one outer cover member in the thick direction used when collectively enclosing two wires 20 with one outer cover member. Thus, it is possible to make the radius of bending of the outer cover member 60 smaller than that of one outer cover member used when collectively enclosing two wires 20. Accordingly, it is possible to improve the bendability of the wire harness 10.

(1-3) Each wire 20 has a flat transverse cross-sectional shape. According to this configuration, the wire 20 has high rigidity in the thick direction, and comparatively low rigidity in the thin direction. Thus, it is possible to easily bend the wire 20 in the thin direction while increasing the rigidity of the wire 20 in the thick direction. Also, because the size of the wire 20 in the thin direction can be reduced, the height of the wire harness 10 can be reduced.

(1-4) Furthermore, each outer cover member 60 has a flat tubular shape. Accordingly, it is possible to form the inner circumferential surface of the outer cover member 60 into a shape extending along the outer circumferential surface of the wire 20, and thus to make the gap (air layer) between the outer circumferential surface of the wire 20 and the inner circumferential surface of the outer cover member 60 smaller. Thus, it is possible to improve the heat dissipation of the wire harness 10.

(1-5) The clamps 70 are attached to the outer circumferential surface of the plurality of outer cover members 60 and fix the plurality of outer cover members 60 to the vehicle body. According to this configuration, it is possible to efficiently transfer heat generated by the wires 20 to the vehicle body with a large surface area through the outer cover members 60 and the clamps 70. This makes it possible to efficiently release heat generated by the wires 20 and to improve the heat dissipation of the wire harness 10.

(1-6) The plurality of outer cover members 60 are arranged side-by-side along their thick direction (their long-side direction). This makes it possible to increase the surface area of the outer circumferential surface of the outer cover member 60 that is exposed to the outside, compared to a case where the plurality of outer cover members 60 are arranged side-by-side along their thin direction. Thus, it is possible to improve the heat dissipation of the wire harness 10.

(1-7) The electromagnetic shielding member 50 for enclosing the wire 20 is provided between the outer circumferential surface of the wire 20 and the inner circumferential surface of the outer cover member 60. It is possible to use a non-shielded electrical wire as the wire 20 because the wire 20 can be electromagnetically shielded by the electromagnetic shielding member 50. According to this configuration, there is no need to perform a process for stripping an insulating sheath or the like to expose the electromagnetic shield structure to the outside to achieve grounding. Thus, it is possible to improve operability for electrically connecting (i.e., grounding) the electromagnetic shielding member 50 to the tubular member 81.

(1-8) The protective member 40, which is formed of reinforced fibers such as para-aramid fibers and has high impact resistance (in particular, shear resistance), is provided between the outer circumferential surface of the wire 20 and the inner circumferential surface of the outer cover member 60. Thus, even if the outer cover member 60 is damaged by impact upon vehicle collision, it is possible to inhibit direct contact between the core wires 21 of the wires 20, and to keep the wires 20 from being electrically connected to each other via a conductor such as a constituent component of the vehicle. Also, because the protective member 40 is an insulating member, the core wires 21 of the wires 20 are kept from being electrically connected to each other via the protective member 40.

(1-9) Incidentally, if the outer circumference of the wire 20 is enclosed by two types of tubular members (the protective member 40 and the electromagnetic shielding member 50 in this embodiment) in a state in which the tubular members are placed on each other, it is difficult to stably fix the tubular member provided in the inner side (the protective member 40 in this embodiment) to the wire 20. Also, if the insulating protective member 40 is disposed on the inner side of the electromagnetic shielding member 50, it is difficult to electrically connect the electromagnetic shielding member 50 and the tubular member 81.

In contrast, in this embodiment, a configuration is adopted in which an end portion of the protective member 40 is connected to the outer circumferential surface of the tubular member 81 by the crimping ring 85 in a state in which the end portion of the protective member 40 is held between the tubular member 81 and the electromagnetic shielding member 50. Also, an end portion of the electromagnetic shielding member 50 is formed to cover an end surface of the end portion of the protective member 40, and the end portion of the electromagnetic shielding member 50 is connected to the outer circumferential surface of the tubular member 81 by the crimping ring 86 in a state in which the end portion of the electromagnetic shielding member 50 is in direct contact with the outer circumferential surface of the tubular member 81. According to this configuration, even if the electromagnetic shielding member 50 is placed on the outer circumference of the protective member 40, it is possible to stably fix the protective member 40 to the outer circumferential surface of the tubular member 81 by crimping the crimping ring 85. Also, the end portion of the electromagnetic shielding member 50 is fixed to the outer circumferential surface of the tubular member 81 at a position that is different from the position to which the protective member 40 is fixed, in a state in which no insulating protective member 40 is interposed between the tubular member 81 and the electromagnetic shielding member 50. Accordingly, it is possible to ensure a stable electrical connection between the electromagnetic shielding member 50 and the tubular member 81 even if the protective member 40 is interposed between the electromagnetic shielding member 50 and the wire 20 (or the tubular member 81).

(1-10) The fitting portion 71 of the clamp 70 is C-shaped, and the insertion portion 77 is formed between the locking portions 75 and 76 facing each other at positions at which their leading end portions are spaced apart from each other. Also, the outer surfaces of the locking portions 75 and 76 are formed into inclined surfaces 75A and 76A that are inclined such that the opening width of the insertion portion 77 increases as the distance from the housing portion 78 increases. According to this configuration, it is possible to guide the end portions of the plurality of outer cover member 60 into the housing portion 78 along the inclined surfaces 75A and 76A of the locking portions 75 and 76 when the outer cover members 60 are inserted into the housing portion 78 of the fitting portion 71 through the insertion hole 77. Accordingly, it is possible to improve the operability for attaching the clamp 70 to the plurality of outer cover members 60.

Second Embodiment

Next, a second embodiment of a wire harness will be described with reference to FIGS. 5 and 6. Note that mainly the differences between the first embodiment and this embodiment will be described, and constituent components that are similar to those of the first embodiment are given the same reference numerals, and some or all of their descriptions may be omitted.

Figure 5:
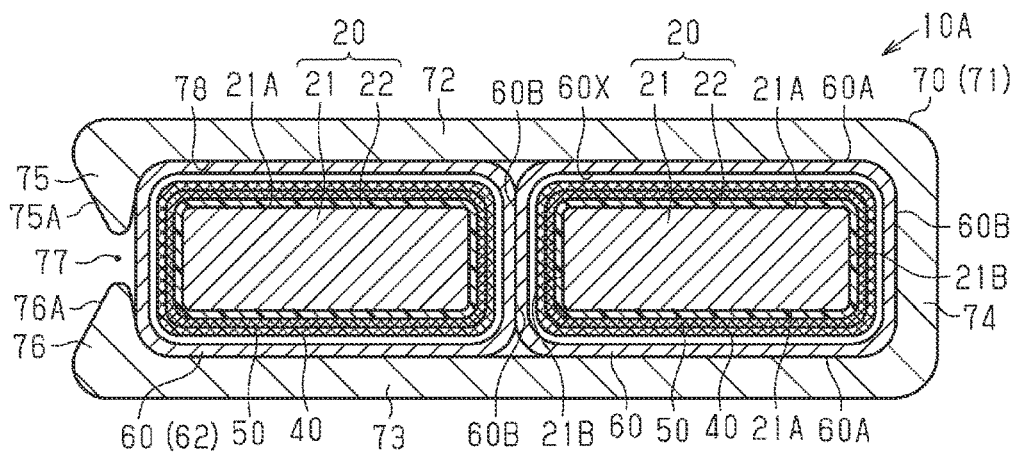
FIG. 5 is a schematic cross-sectional view of a wire harness in a second embodiment.
Figure 6:
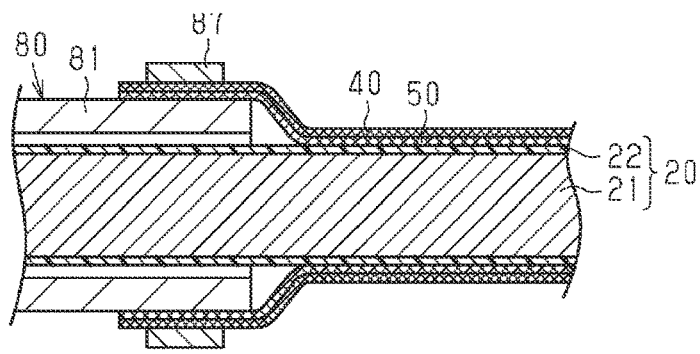
FIG. 6 is a schematic cross-sectional view of the wire harness in the second embodiment.

As shown in FIG. 5, in a wire harness 10A of this embodiment, the protective member 40 and the electromagnetic shielding member 50 are arranged in the opposite manner to that in the wire harness 10 shown in FIG. 2. That is, in the wire harness 10A, an electromagnetic shielding member 50 is formed to cover the outer circumference of each wire 20, and a protective member 40 is formed to cover the outer circumference of the electromagnetic shielding member 50.

Next, the structure of the end portions of the protective member 40 and the electromagnetic shielding member 50 will be described below with reference to FIG. 6. Note that the outer cover members 60 are not shown in FIG. 6.

Out of the wires 20, the electromagnetic shielding members 50, and the protective members 40, only the wires 20 are inserted into the inner portions of the tubular members 81 of the shield shell 80. The end portions of the protective member 40 and the electromagnetic shielding member 50 are fixed to the outer circumferential surface of the tubular member 81. An end portion of the electromagnetic shielding member 50 is fitted to the outside of the tubular member 81, enclosing the entire circumference of the tubular member 81, for example. The electromagnetic shielding member 50 is fitted to the outside of the tubular member 81 in direct contact with the outer circumferential surface of the tubular member 81. The protective member 40 is fitted to the outside of the electromagnetic shielding member 50 that is fitted to the outside of the tubular member 81, enclosing the entire circumference of the electromagnetic shielding member 50, for example.

The end portion of the electromagnetic shielding member 50 is fixed to the outer circumferential surface of the tubular member 81 by a crimping ring 87 provided on the outer circumferential side of the protective member 40 in a state in which the end portion of the electromagnetic shielding member 50 is held between the tubular member 81 and the protective member 40. The crimping ring 87 is fitted to the outside of the tubular member 81 in a state in which the end portions of the protective member 40 and the electromagnetic shielding member 50 are held between the outer circumferential surface of the tubular member 81 and the crimping ring 87. Also, when the crimping ring 87 is crimped, the end portions of the protective member 40 and the electromagnetic shielding member 50 are tightly fixed to the outer circumferential surface of the tubular member 81. At this time, the end portion of the electromagnetic shielding member 50 is tightly fixed to the outer circumferential surface of the tubular member 81 in a state in which the end portion of the electromagnetic shielding member 50 is in direct contact with the outer circumferential surface of the tubular member 81. This ensures a stable electrical connection between the electromagnetic shielding member 50 and the tubular member 81 (the shield shell 80).

According to the above-described embodiment, it is possible to obtain the following effects, in addition to the effects (1-1) to (1-8), and (1-10) of the first embodiment.

(2-1) The electromagnetic shielding member 50 and the protective member 40 are arranged in the stated order on the outer side of the wire 20, and end portions of the electromagnetic shielding member 50 and the protective member 40 are fixed together at one position. According to this configuration, the electromagnetic shielding member 50 can be arranged inward of the insulating protective member 40, and thus it is possible to bring the electromagnetic shielding member 50 into direct contact with the outer circumferential surface of the tubular member 81 even in a state in which the protective member 40 is placed on the electromagnetic shielding member 50. Accordingly, it is possible to ensure a stable electrical connection between the electromagnetic shielding member 50 and the tubular member 81 while reducing the size of the tubular member 81 in the length direction.

Third Embodiment

Next, a third embodiment of a wire harness will be described with reference to FIGS. 7 and 8. Note that mainly the differences between the first embodiment and this embodiment will be described, and constituent components that are similar to those of the first embodiment are given the same reference numerals, and some or all of their descriptions may be omitted.

Figure 7:
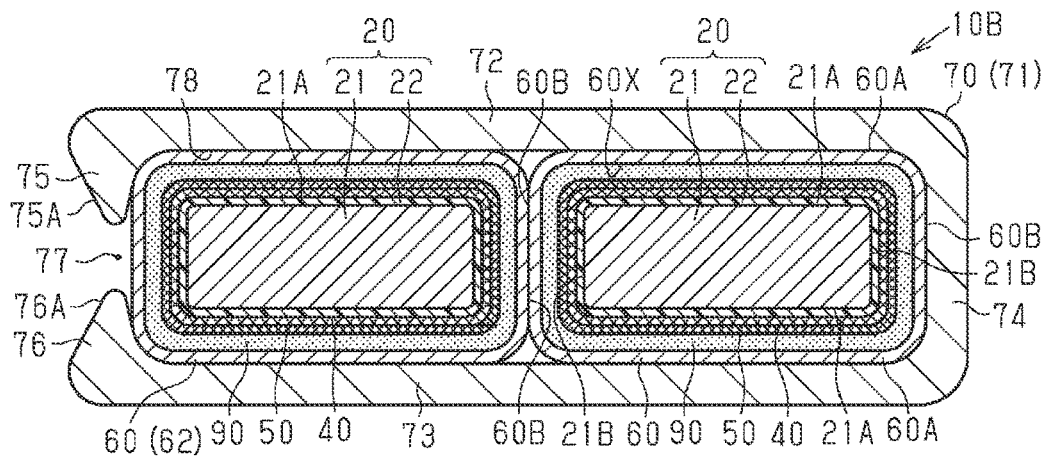
FIG. 7 is a schematic cross-sectional view of a wire harness in a third embodiment.

As shown in FIG. 7, a wire harness 10B includes a heat conductive member 90 (heat conductor) provided between an outer circumferential surface of a wire 20 and an inner circumferential surface of an outer cover member 60. The heat conductive member 90 is made of a material whose heat conductivity is higher than that of an air layer. It is possible to use, for the material of the heat conductive member 90, a material obtained by adding filler having high heat conductivity to an insulating resin such as a polyimide resin, an epoxy resin, or a silicone resin, or silicone rubber, for example. It is possible to use an inorganic filler such as aluminum oxide (alumina), titanium oxide, or magnesium oxide filler for the filler, for example. It is possible to use, as the filler, filler made of metal such as gold (Au), silver (Ag), copper (Cu), aluminum (Al), nickel (Ni), chromium (Cr), or cobalt (Co), or filler in which the surface of metal is covered by an insulating material (e.g., resin material). It is possible to use a sheet-shaped material or a gel-like material (semisolid) as the material of the heat conductive member 90, for example. The heat conductive member 90 of this embodiment is made of a gel-like material.

Figure 8:
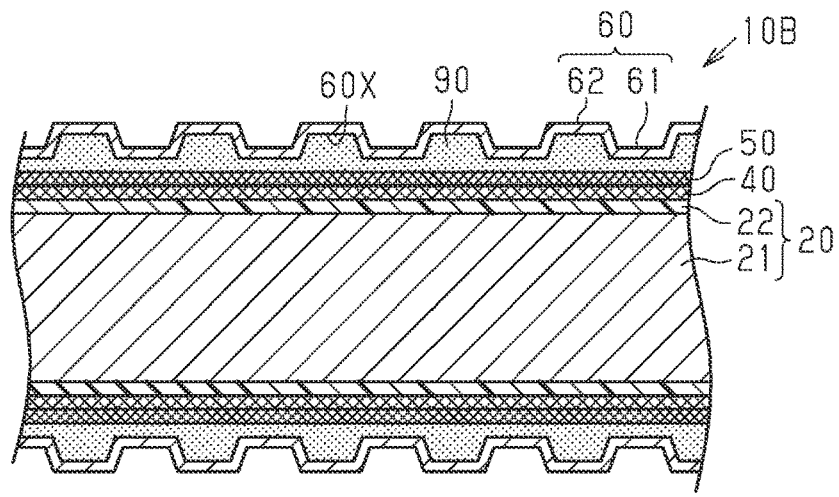
FIG. 8 is a schematic cross-sectional view of the wire harness in the third embodiment.

As shown in FIG. 8, the heat conductive member 90 of this embodiment is provided on the outer side of the protective member 40 and the electromagnetic shielding member 50 that enclose the wire 20. The heat conductive member 90 is formed such that a space between the outer circumferential surface of the electromagnetic shielding member 50 and the inner circumferential surface of the outer cover member 60 is filled with the heat conductive member 90, for example. Specifically, the space between the outer circumferential surface of the electromagnetic shielding member 50 and the inner circumferential surfaces of annular recesses 61 is filled with the heat conductive member 90, and the space between the outer circumferential surface of the electromagnetic shielding member 50 and the inner circumferential surface of the annular protrusions 62 is filled with the heat conductive member 90. A space of the internal space 60X of the annular recess 62 that protrudes from the inner circumferential surface of an annular recess 61 outward in the radial direction of the outer cover member 60 is also filled with the heat conductive member 90. Also, the heat conductive member 90 is formed to enter the meshes of the protective member 40 and the meshes of the electromagnetic shielding member 50, for example. The heat conductive member 90 is formed such that the meshes of the protective member 40 and the electromagnetic shielding member 50 are filled with the heat conductive member 90, for example. In other words, the protective member 40 and the electromagnetic shielding member 50 are embedded in the heat conductive member 90. Accordingly, any gap between the protective member 40 and the electromagnetic shielding member 50 is filled with the heat conductive member 90.

Such a heat conductive member 90 can be formed by inserting the wire 20 covered by the protective member 40 and the electromagnetic shielding member 50 into the internal space 60X of the outer cover member 60, and then injecting a highly heat conductive gel-like material such that the space between the outer circumferential surface of the electromagnetic shielding member 50 and the inner circumferential surface of the outer cover member 60 is filled with the conductive material, for example. Also, the heat conductive member 90 can be formed by forming a gel-like heat conductive member 90 on the outer circumferential surface of the electromagnetic shielding member 50 enclosing the wire 20 and the protective member 40, and reducing the diameter of the outer cover member 60 to fasten the heat conductive member 90 from the outside to subject the gel-like heat conductive member 90 to plastic deformation by its fastening force. A corrugated tube having a cut extending in the length direction can be used for the outer cover member 60 in this case, for example.

According to the above-described embodiment, it is possible to obtain the following effects, in addition to the effects (1-1) to (1-10) of the first embodiment.

(3-1) The heat conductive member 90 made of a material whose heat conductivity is higher than that of an air layer is provided between the outer circumferential surface of the wire 20 and the inner circumferential surface of the outer cover member 60. According to this configuration, it is possible to reduce an air layer (that is, a heat insulating layer) between the wire 20 and the outer cover member 60, and thus, to reduce thermal resistance between the outer circumferential surface of the wire 20 and the inner circumferential surface of the outer cover member 60. This makes it possible to efficiently release heat generated by the wire 20 and to improve the heat dissipation of the wire harness 10B.

(3-2) The heat conductive member 90 is formed such that the space between the outer circumferential surface of the electromagnetic shielding member 50 and the inner circumferential surface of the outer cover member 60 is filled with the heat conductive member 90. According to this configuration, it is possible to substitute the air layer (that is, the heat insulating layer) between the outer circumferential surface of the electromagnetic shielding member 50 and the inner circumferential surface of the outer cover member 60 with the heat conductive member 90 having high heat conductivity, and thus, to reduce thermal resistance between the outer circumferential surface of the wire 20 and the inner circumferential surface of the outer cover member 60. Accordingly, it is possible to improve the heat dissipation of the wire harness 10B.

(3-3) The heat conductive member 90 is formed such that the meshes of the protective member 40 and the meshes of the electromagnetic shielding member 50 are filled with the heat conductive member 90. According to this configuration, it is possible to increase the area of contact between the heat conductive member 90 and the protective member 40, and the area of contact between the protective member 40 and the electromagnetic shielding member 50. Accordingly, it is possible to reduce thermal resistance between the heat conductive member 90 and the protective member 40, and thermal resistance between the heat conductive member 90 and the electromagnetic shielding member 50, and thus to improve the heat dissipation of the wire harness 10B.

Modifications of First to Third Embodiments

The first to third embodiments described above can be modified as follows. The embodiments described above and following modifications may be combined to the extent that they do not contradict each other technically.

Although the protective member 40 is provided to all of the plurality of wires 20 in the above-described embodiments, there is no limitation to this.

Figure 9:
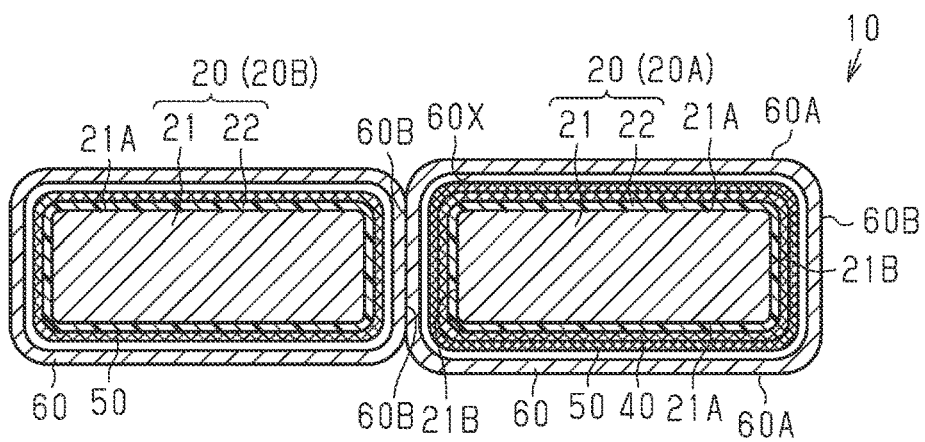
FIG. 9 is a schematic cross-sectional view of a wire harness in a modification.

As shown in FIG. 9, the protective member 40 may also be provided to only one or some of the plurality of wires 20, for example. The wires 20 include a positive-side wire 20A connected to the positive terminal of the high voltage battery 12 (see FIG. 1) and a negative-side wire 20B connected to the negative terminal of the high voltage battery 12. A configuration may also be adopted in which the protective member 40 is provided to only the positive-side wire 20A out of these wires 20A and 20B, and no protective member 40 is provided to the negative-side wire 20B. According to this configuration, it is possible to favorably inhibit short circuits between the positive-side wire 20A and the negative-side wire 20B while inhibiting an increase in the costs to manufacture the wire harness 10.

There is no particular limitation to the structure of the clamps 70 of the above-described embodiments.

Figure 10:
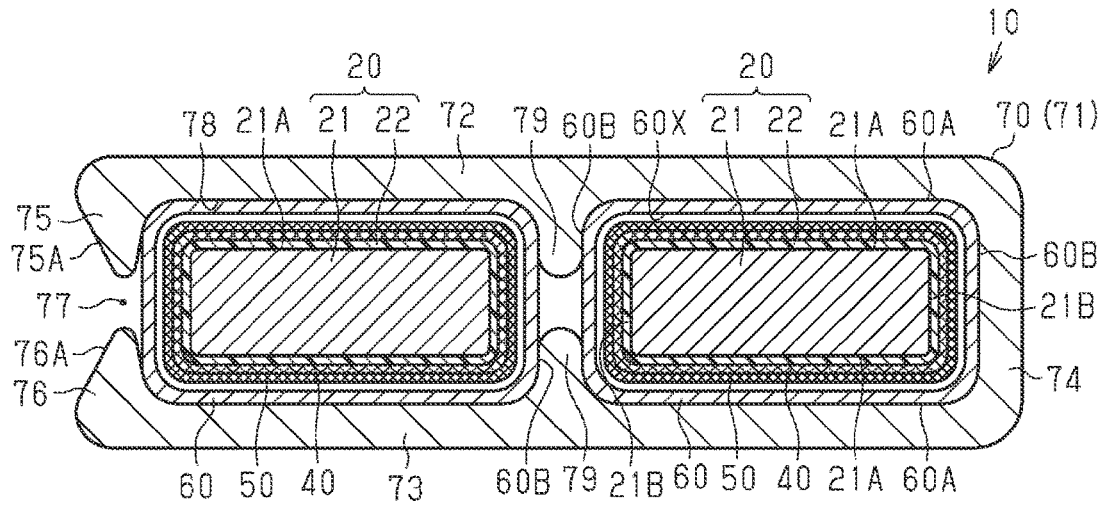
FIG. 10 is a schematic cross-sectional view of a wire harness in a modification.

As shown in FIG. 10, a structure may also be adopted in which the clamp 70 has protruding portions 79 for fixing the plurality of outer cover members 60 in a state in which the outer cover members 60 are spaced apart from each other. The protruding portions 79 protrude from inner surfaces of the plate portion 72 and 73 toward the inner portion of the housing portion 78, for example. The protruding portion 79 formed on the plate portion 72 and the protruding portion 79 formed on the plate portion 73 face each other in a state in which the protruding portions 79 are spaced apart from each other, for example. The protruding portions 79 extend along the length direction of the outer cover member 60, for example. Portions of the side surfaces 60B of the outer cover members 60 are in contact with the side surfaces of the protruding portions 79. According to this configuration, it is possible to increase the surface area of the outer circumferential surface of the outer cover member 60 that is exposed to the outside because the side surfaces 60B of adjacent outer cover members 60 can be spaced apart from each other. Accordingly, it is possible to improve the heat dissipation of the wire harness 10.

The protruding portion 79 may also be provided on only one of the plate portions 72 and 73 in the clamp 70 shown in FIG. 10.

Figure 11:
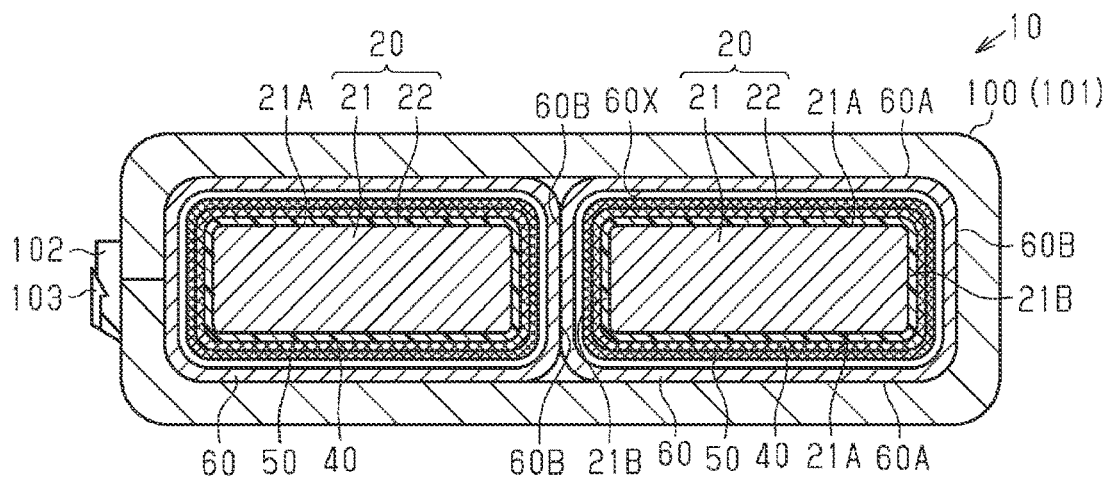
FIG. 11 is a schematic cross-sectional view of a wire harness in a modification.

As with a clamp 100 shown in FIG. 11, a structure may also be adopted in which a fitting portion 101 for enclosing the entire circumference of the plurality of outer cover members 60 is provided. The fitting portion 101 has a tubular shape (a rectangular tubular shape in this modification) overall with a size to be fitted to the outside of the plurality of outer cover members 60 that are bundled together. The fitting portion 101 has a locking portion 102 and a locked portion 103 that can be locked to each other. With the clamp 100, the fitting portion 101 can be opened by releasing locking between the locking portion 102 and the locking portion 103. The plurality of outer cover members 60 can be fitted to the inside of the fitting portion 101 by opening the fitting portion 101. Also, with the clamp 100, the plurality of outer cover members 60 can be held inside the fitting portion 101 by closing the fitting portion 101. With the clamp 100, the closed state of the fitting portion 101 is locked by locking the locking portion 102 to the locked portion 103. Note that at least a portion of the inner circumferential surface of the fitting portion 101 is in contact with the outer circumferential surface of the outer cover member 60 in a state in which the fitting portion 101 is locked, for example.

Although clamps for fixing the plurality of outer cover members 60 collectively to a vehicle body are adopted as the clamps 70 of the above-described embodiments, there is no limitation thereto. Clamps for fixing the plurality of outer cover members 60 individually to a vehicle body may also be adopted, for example.

Although the wire 20 has a rectangular transverse cross-sectional shape in the above-described embodiments, there is no limitation thereto.

Figure 12:
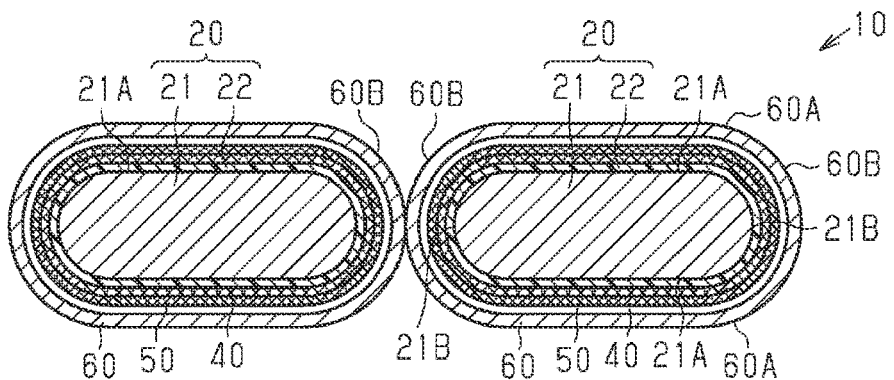
FIG. 12 is a schematic cross-sectional view of a wire harness in a modification.

As shown in FIG. 12, the transverse cross-sectional shape of the core wire 21 of the wire 20 may also be an oval shape, for example. An "oval shape" in this specification is a shape constituted by two parallel lines with substantially equal lengths and two semicircles. The core wire 21 in this modification has a pair of long-side surfaces 21A and side surfaces 21B (arc portions) formed in an arc shape between the two long-side surfaces 21A. The pair of long-side surfaces 21A and the pair of side surfaces 21B extend over the entire length of the core wire 21 in the length direction. The insulating sheath 22, the protective member 40, the electromagnetic shielding member 50, and the outer cover member 60 that enclose the outer circumference of the core wire 21 have a shape extending along the outer circumferential shape of the core wire 21, for example. The outer cover member 60 of this modification has an oval inner circumferential cross-sectional shape and an oval outer circumferential cross-sectional shape. The outer circumferential surface of the outer cover member 60 has a pair of long-side surfaces 60A and side surfaces 60B (arc portions) formed in an arc shape between the two long-side surfaces 60A.

A plurality (two in this modification) of the outer cover members 60 are arranged side-by-side in the thick direction of the core wires 21 and the outer cover members 60. The two outer cover members 60 are arranged in a state in which portions of their side surfaces 60B are in contact with each other, for example. According to this configuration, it is possible to increase the surface area of the outer circumferential surface of the outer cover member 60 that is exposed to the outside, and thus to improve the heat dissipation of the wire harness 10.

Figure 13:
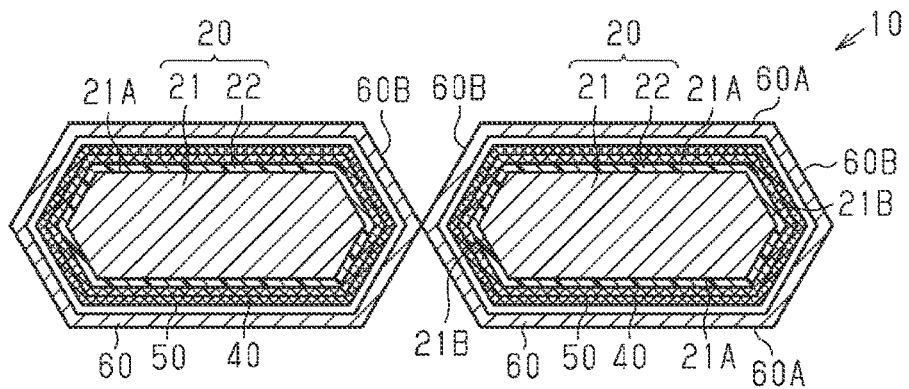
FIG. 13 is a schematic cross-sectional view of a wire harness in a modification.

As shown in FIG. 13, the transverse cross-sectional shape of the core wire 21 of the wire 20 may also be formed into a flat shape of a pentagon or a higher polygon (hexagon in this modification), for example. The insulating sheath 22, the protective member 40, the electromagnetic shielding member 50, and the outer cover member 60 that enclose the outer circumference of the core wire 21 have a shape extending along the outer circumferential shape of the core wire 21, for example. The inner and outer circumferential cross-sectional shapes of the outer cover member 60 of this modification are flat hexagonal shapes. The plurality of outer cover members 60 are arranged side-by-side in the thick direction of the core wires 21 and the outer cover members 60.

Although the plurality of outer cover members 60 are arranged side-by-side in their thick directions such that the thick directions extend side-by-side along the width direction of the vehicle in the above-described embodiments, there is no limitation to the arrangement of the plurality of outer cover members 60.

Figure 14A:
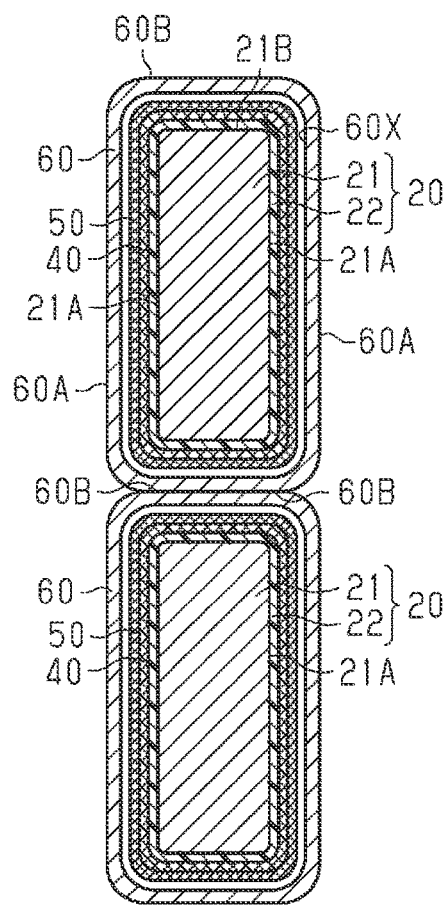
FIGS. 14(a) to 14(c) are schematic cross-sectional views of a wire harness in a modification.

A configuration may also be adopted in which, as shown in FIG. 14(a), for example, the plurality of outer cover members 60 are arranged side-by-side in their thick directions such that the thick directions extend side-by-side along the vertical direction of the vehicle. In this case, the thin directions of the core wire 21 and the outer cover member 60 extend along the width direction of the vehicle.

Figure 14B:
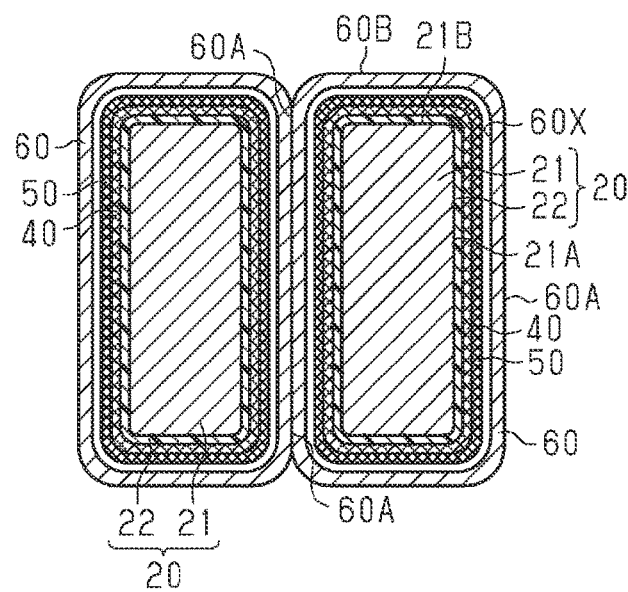

A configuration may also be adopted in which, as shown in FIG. 14(b), for example, the plurality of outer cover members 60 are arranged side-by-side in their thin directions such that the thin directions extend side-by-side along the width direction of the vehicle. In this case, the thick directions of the core wires 21 and the outer cover members 60 extend along the vertical direction of the vehicle. Also, the two outer cover members 60 are arranged side-by-side in a state in which their long-side surfaces 60A are in contact with each other, for example.

Figure 14C:
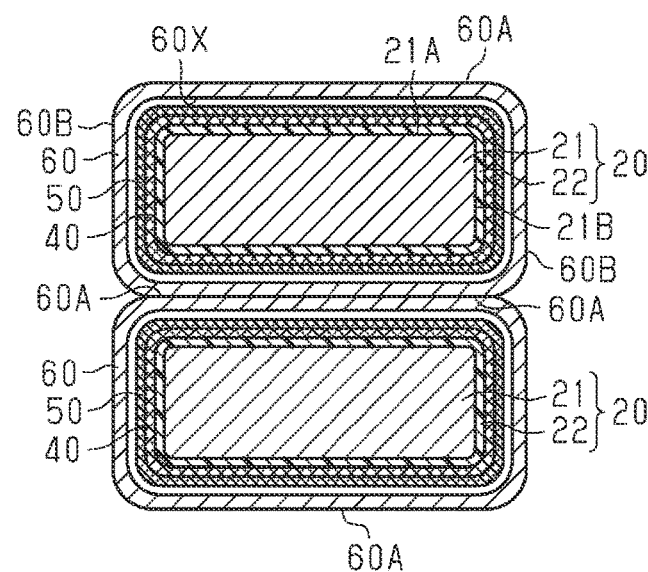

A configuration may also be adopted in which, as shown in FIG. 14(c), for example, the plurality of outer cover members 60 are arranged side-by-side in their thin directions such that the thin directions extend side-by-side along the vertical direction of the vehicle. In this case, the thick directions of the core wires 21 and the outer cover members 60 extend along the width direction of the vehicle. Also, the two outer cover members 60 are arranged side-by-side in a state in which their long-side surfaces 60A are in contact with each other, for example.

The arrangement of the heat conductive member 90, the protective member 40, and the electromagnetic shielding member 50 in the above-described third embodiment may also be changed as appropriate. The heat conductive member 90 may also be formed to cover the outer circumference of the insulating sheath 22 of the wire 20, and the protective member 40 and the electromagnetic shielding member 50 may also be formed to cover the outer circumference of the heat conductive member 90, for example.

The heat conductive member 90 in the above-described third embodiment may also be provided over substantially the entire length of the outer cover member 60 in the length direction. Also, the heat conductive member 90 may also be provided partially in the length direction of the wire 20.

The heat conductive member 90 in the above-described third embodiment may also be formed as a single body with the inner circumferential surface of the outer cover member 60.

Fourth Embodiment

Next, a fourth embodiment of a wire harness will be described with reference to FIGS. 15 and 16. Note that mainly the differences between the first embodiment and this embodiment will be described, and constituent components that are similar to those of the first embodiment are given the same reference numerals, and some or all of their descriptions may be omitted.

Figure 15:
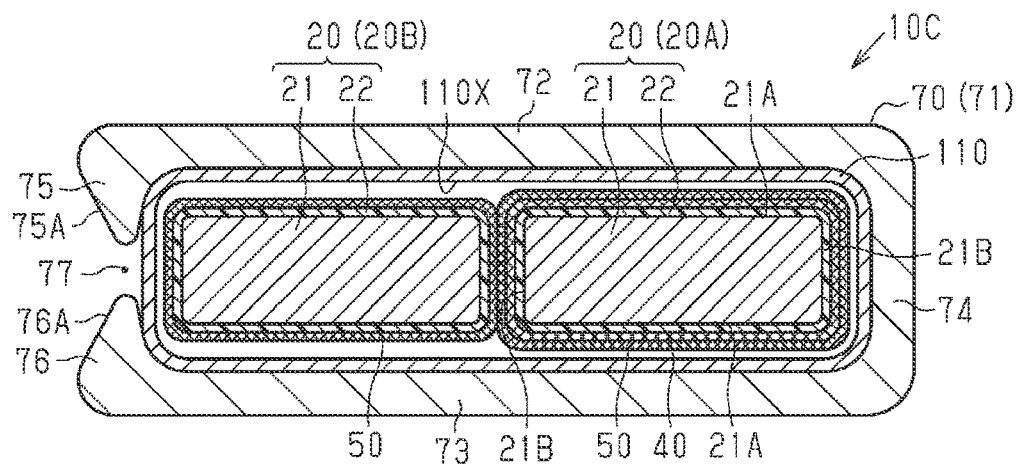
FIG. 15 is a schematic cross-sectional view of a wire harness in a fourth embodiment.
Figure 16A:
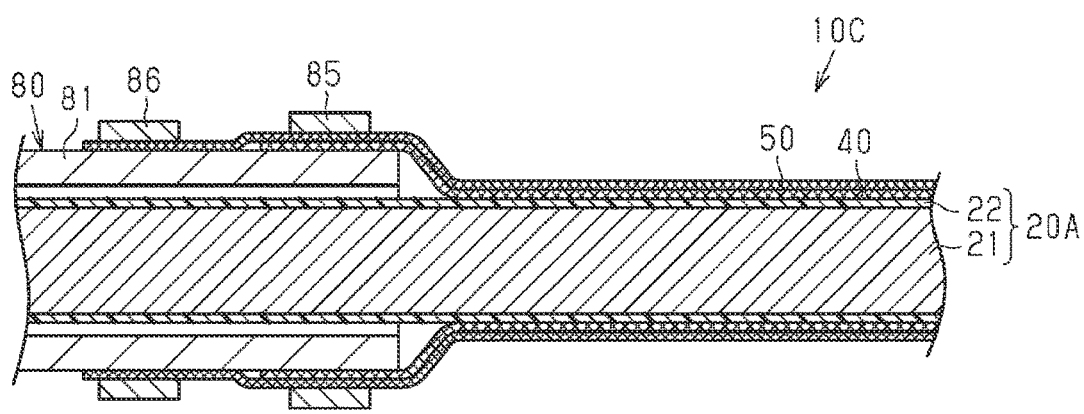
FIG. 16 is a schematic cross-sectional view of the wire harness in the fourth embodiment.
Figure 16B:
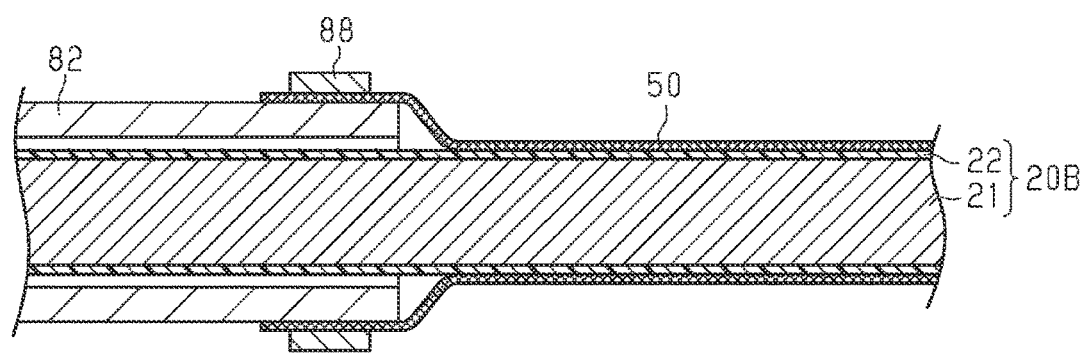

As shown in FIG. 15, a wire harness 10C includes a plurality (two in this embodiment) wires 20, an outer cover member 110 for collectively enclosing the plurality of wires 20, and a clamp 70. The wires 20 in this embodiment each include two high-voltage wires, namely, a positive-side wire 20A connected to the positive terminal of a high voltage battery 12 (see FIG. 1) and a negative-side wire 20B connected to the negative terminal of the high voltage battery 12.

A protective member 40 is formed on the outer circumference of each wire 20A to cover the outer circumference of the wire 20A. An electromagnetic shielding member 50 is formed on the outer circumference of each protective member 40 to cover the outer circumference of the protective member 40.

An electromagnetic shielding member 50 is formed on the outer circumference of the wire 20B to cover the outer circumference of the wire 20B. The electrical wire 20B is provided with no protective member 40.

Similarly to the outer cover member 60 shown in FIG. 3, the outer cover member 110 is a flat tubular corrugated tube. The multiple (two in this embodiment) wires 20A and 20B are arranged in an internal space 110X of the outer cover member 110. The two wires 20A and 20B are arranged side-by-side in the thick direction (the long-side direction) of the core wire 21 in the internal space 110X. That is, the two wires 20A and 20B are arranged side-by-side in a state in which the side surfaces 21B of their core wires 21 face each other, for example. The two wires 20A and 20B are arranged side-by-side in a state in which the outer circumferential surfaces of the electromagnetic shielding members 50 in portions covering the side surfaces 21B of the core wires 21 are in contact with each other, for example. Also, the two wires 20A and 20B are arranged such that the thin directions (the short-side directions) of the core wires 21 extend along the vertical direction of the vehicle.

The clamp 70 is attached to the outer circumferential surface of the outer cover member 110. A fitting portion 71 of the clamp 70 is fitted to the outside of one outer cover member 110. The clamp 70 is fixed to a vehicle body by fixing portions (not shown). The outer cover member 110 is fixed to the vehicle body by the clamp 70.

Next, the structure of end portions of the protective member 40 and the electromagnetic shielding member 50 will be described below with reference to FIG. 16. Note that the outer cover member 110 is not shown in FIG. 16.

The end portions of the wires 20A and 20B are inserted into a shield shell 80 of a connector C1 (see FIG. 1). The shield shell 80 has a tubular member 81 into which the wire 20A is inserted, and a conductive tubular member 82 into which the wire 20B is inserted, for example. The tubular members 81 and 82 (the shield shell 80) are made of metal.

The tubular members 81 and 82 have a rectangular tubular shape whose inner and outer circumferential cross-sectional shapes are rectangular, for example. Out of the wire 20A, the protective members 40, and the electromagnetic shielding members 50, only the wire 20A is inserted into the inner portion of the tubular member 81. An end portion of the protective member 40 is connected to the outer circumferential surface of the tubular member 81 by a crimping ring 85 in a state in which the end portion of the protective member 40 is held between the tubular member 81 and the electromagnetic shielding member 50. The entire length of the electromagnetic shielding member 50 is longer than that of the protective member 40, and the electromagnetic shielding member 50 covers an end surface of the end portion of the protective member 40. An end portion of the electromagnetic shielding member 50 is connected to the outer circumferential surface of the tubular member 81 by a crimping ring 86 in a state in which the end portion of the electromagnetic shielding member 50 is in direct contact with the outer circumferential surface of the tubular member 81.

Out of the wire 20B and the electromagnetic shielding members 50, only the wire 20B is inserted into the inner portion of the tubular member 82. An end portion of the electromagnetic shielding member 50 is fixed to the outer circumferential surface of the tubular member 82. The end portion of the electromagnetic shielding member 50 is fitted to the outside of the tubular member 82, enclosing the entire circumference of the tubular member 82, for example. The end portion of the electromagnetic shielding member 50 is fixed to the outer circumferential surface of the tubular member 82 by a crimping ring 88 provided on the outer circumferential side of the electromagnetic shielding member 50. When the crimping ring 88 is crimped, the end portion of the electromagnetic shielding member 50 is tightly fixed to the outer circumferential surface of the tubular member 82 in a state in which the end portion of the electromagnetic shielding member 50 is in direct contact with the outer circumferential surface of the tubular member 82. This ensures a stable electrical connection between the electromagnetic shielding member 50 and the tubular member 82 (the shield shell 80).

According to the above-described embodiment, it is possible to obtain effects similar to the effects (1-3) to (1-10) of the first embodiment.

Modifications of Fourth Embodiment

The fourth embodiment described above can be modified as follows. The fourth embodiment described above and the following modifications may be combined to the extent that they do not contradict each other technically.

Figure 17:
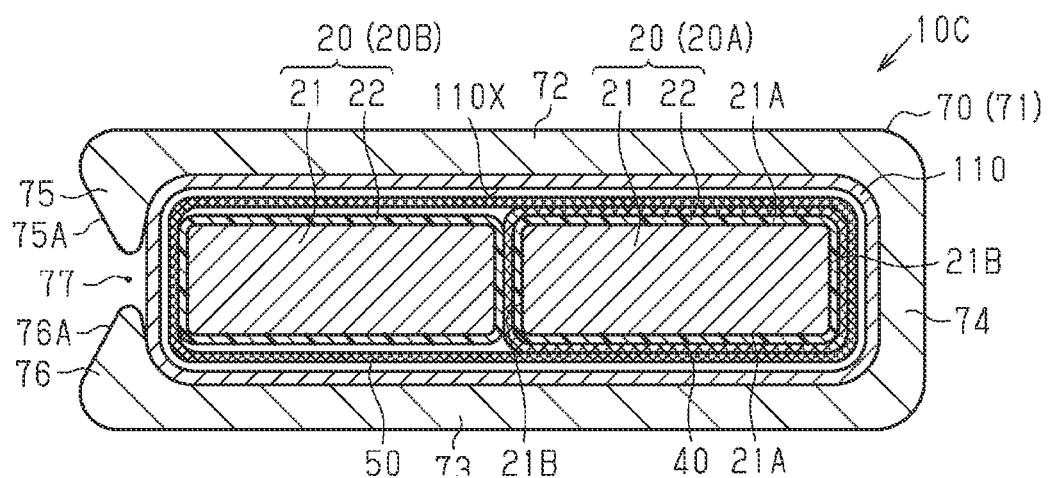
FIG. 17 is a schematic cross-sectional view of a wire harness in a modification.

As shown in FIG. 17, the electromagnetic shielding member 50 may also be formed to collectively enclose the plurality of wires 20. The electromagnetic shielding member 50 may be formed to collectively cover the wire 20A covered by the protective member 40 and the wire 20B, for example.

Figure 18:
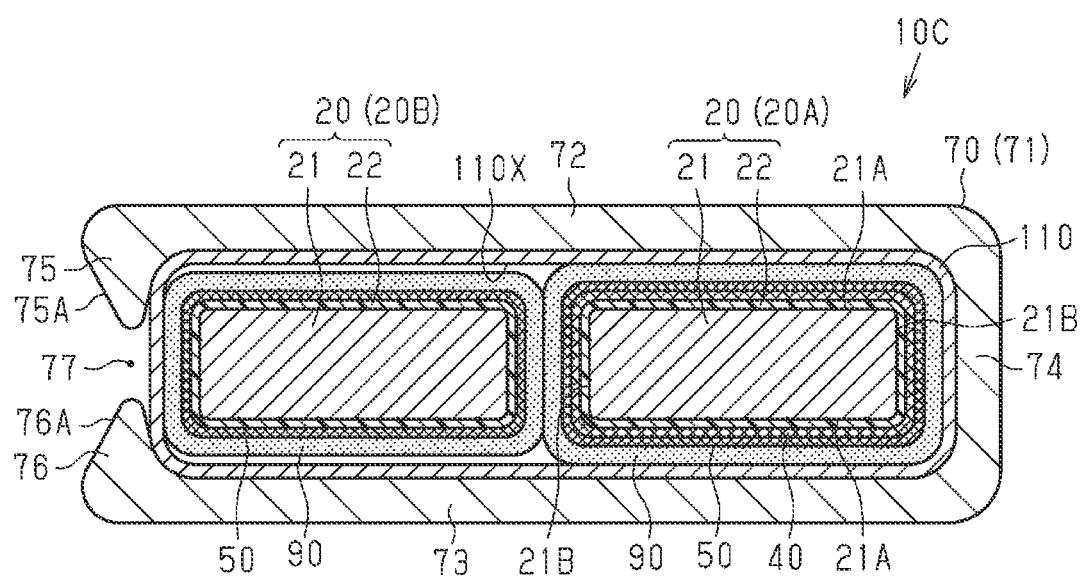
FIG. 18 is a schematic cross-sectional view of a wire harness in a modification.

As shown in FIG. 18, a configuration may also be adopted in which each wire 20 is provided with a heat conductive member 90. The heat conductive members 90 are formed to respectively cover the outer circumferences of the electromagnetic shielding members 50 covering the outer sides of the wires 20A and 20B, for example. The heat conductive member 90 is formed such that the meshes of the protective member 40 and the meshes of the electromagnetic shielding member 50 are filled with the heat conductive members 90, for example. Also, a configuration may also be adopted in which the heat conductive member 90 is provided to collectively cover the plurality of wires 20.

There is no particular limitation to the arrangement of the wires 20A and 20B in the internal space 110X of the outer cover member 110 in the above-described fourth embodiment. The plurality of wires 20A and 20B may also be arranged side-by-side in the thin direction of the core wires 21 in the internal space 110X, for example.

With the wire 20A of the above-described fourth embodiment, the arrangement of the protective member 40 and the electromagnetic shielding member 50 may also be changed as appropriate. A configuration may also be adopted in which the electromagnetic shielding member 50 is formed to cover the outer circumference of the insulating sheath 22 of the wire 20A, and the protective member 40 is formed to cover the outer circumference of the electromagnetic shielding member 50, for example. In this case, the outer circumferential surface of the protective member 40 enclosing the wire 20A and the electromagnetic shielding member 50 and the outer circumferential surface of the electromagnetic shielding member 50 enclosing the wire 20B are in contact with each other in the internal space 110X of the outer cover member 110, for example.

The wire 20B of the above-described fourth embodiment may also be provided with the protective member 40.

Other Embodiments

The embodiments described above can be modified as follows. The embodiments described above and following modifications may be combined to the extent that they do not contradict each other technically.

Although the crimping rings 85 to 88 are used as linking members (links) for fixing the protective member 40 and the electromagnetic shielding member 50 to the tubular members 81 and 82 in the above-described embodiments, there is no limitation thereto. A metal band, or a cable tie or adhesive tape made of resin, or the like may also be used as a linking member, instead of the crimping rings 85 to 88, for example.

Although an end portion of the protective member 40 is fixed to the outer circumferential surface of the tubular member 81 in the above-described embodiments, there is no particular limitation to the fixing position. The end portion of the protective member 40 may also be fixed onto the wire 20, for example. In this case, the end portion of the protective member 40 may also be fixed onto the wire 20 using adhesive tape, for example.

Although a fixing member for fixing the outer cover members 60 and 110 is used as the clamp 70 in the above-described embodiments, there is no limitation to this. The fixing member for fixing the outer cover members 60 and 110 is not limited to a fixing member to be fixed to a vehicle body, and adhesive tape, a cable tie, or the like can be used, for example.

The outer cover members 60 and 110 in the above-described embodiments may also have a cut extending in the length direction.

The protective member 40 in the above-described embodiments may also be omitted.

The electromagnetic shielding member 50 in the above-described embodiments may also be omitted. If the outer cover members 60 and 110 are made of a conductive material, for example, the outer cover members 60 and 110 can function as electromagnetic shielding members.

Although non-shielded wires are used as the wires 20 in the above-described embodiments, the types of wires 20 are not limited to this. Shielded wires having a shielding structure therein may also be used as the wires 20, for example.

Although the wire harness 10 has an electromagnetic shielding function in the above-described embodiments, wire harnesses without any electromagnetic shielding function may also be used as the wire harness 10.

Although the two wires 20 constitute the wire harness 10 in the above-described embodiments, there is no limitation thereto. The number of wires 20 can be changed in accordance with the specification of a vehicle. The number of wires 20 may also be one, three or more, for example. Low-voltage electrical wires that connect a low-voltage battery and various low-voltage devices (e.g., a lamp and a car audio device) may be added as wires constituting the wire harness 10, for example.

The arrangement relationship between the inverter 11 and the high-voltage battery 12 in the vehicle is not limited to those in the above-described embodiments, and may be changed as appropriate in accordance with the configuration of the vehicle.

Although the inverter 11 and the high-voltage battery 12 are adopted for electric apparatuses connected by the wires 20 in the above-described embodiments, there is no limitation to this. The present disclosure is also applicable to wires that connect the inverter 11 and a wheel driving motor, for example. That is, it can be applied to any component that electrically connects electric apparatuses installed in a vehicle.

The side surfaces 21B of the core wire 21 are representative examples of non-long side surfaces of the core wire 21 excluding the long-side surfaces 21A in the above-described embodiments, and may be formed as short-side surfaces of the core wire 21 in some non-limiting examples. The side surfaces 60B of the outer cover member 60 are representative examples of non-long side surfaces of the outer cover member 60 excluding the long-side surfaces 60A, and may be formed as short-side surfaces of the outer cover member 60 in some non-limiting examples.

The outer circumferential surface of the core wire 21 is constituted by a plurality of long-side surfaces 21A and a plurality of side surfaces (non-long side surfaces) 21B of the core wire 21 in the above-described embodiment.

Each long-side surface 21A has a first area, each side surface (non-long side surface) 21B has a second area, and the first area is larger than the second area. The long-side surfaces 21A of the core wire 21 are representative examples of the first surface of the core wire 21, and in some non-limiting examples, the long-side surfaces 21A of the core wire 21 may be formed as portions having the maximum area, out of the plurality of surface portions forming the outer circumferential surface of the core wire 21. The side surfaces 21B of the core wire 21 are representative examples of the second surface of the core wire 21, and in some non-limiting examples, the side surfaces 21B of the core wire 21 may be formed as portions having the minimum area, out of the plurality of surface portions forming the outer circumferential surface of the core wire 21. The same applies to the outer cover members 60 and 110.

The present disclosure encompasses the following implementation examples. Not for limitation but for assistance in understanding, the reference numerals of the representative components in the representative embodiment are provided.

A wire harness (10; 10A) according to a non-limiting implementation example includes:
a plurality of flat wires (20);
a plurality of tubular flat outer cover members (60; 110), each of which having an internal space (60X) for housing one of the plurality of flat wires (20); and
at least one clamp (70; 100) configured to align side-by-side the plurality of tubular flat outer cover members (60; 110) in which the plurality of flat wires (20) are respectively housed and to fixedly attach the outer cover members (60; 110) to a vehicle body;
in which, in a transverse cross-sectional view of the wire harness (10; 10A), the flat wires (20) each have a flat transverse cross-section, and the tubular flat outer cover members (60; 110) each have a flat transverse cross-section corresponding to the flat transverse cross-section of the corresponding flat wire (20).

In a non-limiting implementation example, the plurality of flat wires (20) each include a flat metal core wire (21) having an outer circumferential surface and an insulating sheath (22) that is in intimate contact with the outer circumferential surface of the flat metal core wire (21), the outer circumferential surface of the flat metal core wire (21) is formed by a plurality of surface portions that include one or more first surface portions (21A), and one more second surface portions (21B), out of the plurality of surface portions of the outer circumferential surface of the flat metal core wire (21), the one or more first surface portions (21A) each have the maximum area, out of the plurality of surface portions of the outer circumferential surface of the flat metal core wire (21), the one or more second surface portions (21B) each have the minimum area, and in a transverse cross-sectional view of the wire harness (10; 10A), at least one or all of the one or more first surface portions (21A) of the flat metal core wire (21) of a first flat wire, which is one of two adjacent flat wires (20), do not face the outer circumferential surface of the flat metal core wire (21) of a second flat wire, which is the other of the two adjacent flat wires (20), and face outward in a radial direction of the wire harness (10; 10A).

In a non-limiting implementation example, in a transverse cross-sectional view of the wire harness (10; 10A), one of the one or more second surface portions (21B) of the flat metal core wire (21) of the first flat wire faces one of the one or more second surface portions (21B) of the second flat wire.

In a non-limiting implementation example, the one or more first surface portions (21A) of the flat metal core wire (21) are two of the first surface portions (21A), and the one or more second surface portions (21B) of the flat metal core wire (21) are two of the second surface portions (21B).

In a non-limiting implementation example, in a transverse cross-sectional view of the wire harness (10; 10A), one of the two first surface portions (21A) of the flat metal core wire (21) of the first flat wire faces one of the two first surface portions (21A) of the flat metal core wire (21) of the second flat wire, and in a transverse cross-sectional view of the wire harness (10; 10A), the other of the two first surface portions (21A) of the flat metal core wire (21) of the first flat wire does not face the outer circumferential surface of the flat metal core wire (21) of the second flat wire, and faces outward in the radial direction of the wire harness (10; 10A).

In a non-limiting implementation example, the two first surface portions (21A) of the flat metal core wire (21) are flat surfaces, and the two second surface portions (21B) of the flat metal core wire (21) are flat surfaces or curved surfaces.

In a non-limiting implementation example, the flat wires (20) each include a plurality of stacked intermediate layers (40, 50, and 90) that are in intimate contact with the entire circumference of the insulating sheath (22).

In a non-limiting implementation example, the plurality of intermediate layers (40, 50, 90) of the flat wire (20) include a heat conductive member layer (90) whose heat conductivity is higher than that of air.

It will be apparent to those skilled in the art that the present disclosure may be embodied in other specific forms without departing from the technical concept of the present disclosure. Some of the components described in the embodiments (or one or more aspects thereof) may be omitted, or some of the components may be combined, for example. The scope of the present disclosure should be determined with reference to the appended claims, along with the full scope of equivalents to which such claims are entitled.

The invention claimed is:

1. A wire harness comprising:
a plurality of wires each including a core wire whose transverse cross-sectional shape is a flat shape, and an insulating sheath covering an outer circumference of the core wire;
a plurality of outer covers, each one into which a respective one of the plurality of wires are inserted, wherein the outer covers are independent of each other and each have a flat tubular shape;
a clamp that is attached to outer circumferential surfaces of the outer covers and that fixes the outer covers to a vehicle body; and
for each of the ones of the plurality of wires:
a protective tube that encloses an outer circumference of the insulating sheath and is formed by reinforced fibers;
a tubular electromagnetic shield enclosing an outer circumference of the protective tube; and
a conductive tube having an outer circumferential surface to which an end of the electromagnetic shield is connected, wherein:

an end of the protective tube is connected to the outer circumferential surface of the conductive tube by a first link member in a state in which the end of the protective tube is held between the conductive tube and the electromagnetic shield, and an end of the electromagnetic shield covers an end surface of the end of the protective tube, and is connected to the outer circumferential surface of the conductive tube by a second link member in a state in which the end of the electromagnetic shield is in direct contact with the outer circumferential surface of the conductive tube.

2. The wire harness according to claim 1,
wherein for each of the ones of the plurality of wires, a heat conductor that encloses an outer circumference of the each one of the plurality of wires and is made of a material whose heat conductivity is higher than that of an air layer is provided between an outer circumferential surface of the each one of the plurality of wires and an inner circumferential surface of a respective one of the plurality of outer covers.

3. The wire harness according to claim 1, wherein:
the electromagnetic shield is a braided member in which a plurality of bare metal wires are braided, and
the heat conductor is made of a gel material, and is formed such that meshes of the braided member are filled with the heat conductor.

4. The wire harness according to claim 2, wherein:
the outer covers are a corrugated tube in which annular protrusions and annular recesses are arranged alternately in a length direction, and the heat conductor is formed such that a space between the outer circumferential surface of the each one of the plurality of wires and the inner circumferential surface of the respective one of the plurality of outer covers is filled with the heat conductor.

5. The wire harness according to claim 1,
wherein an inner surface of the clamp is provided with a protrusion for separating two adjacent outer covers from each other.

6. The wire harness according to claim 1,
wherein the outer covers are arranged side-by-side in a thick direction of the outer covers.

7. The wire harness according to claim 1, wherein for each of the ones of the plurality of wires:
the core wire has an oval transverse cross-sectional shape and the outer covers have an oval transverse cross-sectional shape, and
the outer covers are arranged side-by-side such that arc portions of the oval shapes are in contact with each other.

8. The wire harness according to claim 1,
wherein for each of the ones of the plurality of wires, a heat conductor that encloses an outer circumference of the each one of the plurality of wires and is made of a material whose heat conductivity is higher than that of an air layer is provided between an outer circumferential surface of the each one of the plurality of wires and an inner circumferential surface of a respective one of the plurality of outer covers.

* * * * *